United States Patent
Yen et al.

(10) Patent No.: US 8,442,839 B2
(45) Date of Patent: May 14, 2013

(54) AGENT-BASED COLLABORATIVE RECOGNITION-PRIMED DECISION-MAKING

(75) Inventors: John Yen, State College, PA (US);
Xiaocong Fan, State College, PA (US);
Shuang Sun, University Park, PA (US);
Michael McNeese, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 2049 days.

(21) Appl. No.: 11/181,146

(22) Filed: Jul. 14, 2005

(65) Prior Publication Data

US 2007/0016464 A1 Jan. 18, 2007

Related U.S. Application Data

(60) Provisional application No. 60/588,516, filed on Jul. 16, 2004.

(51) Int. Cl.
*G06Q 10/00* (2012.01)

(52) U.S. Cl.
USPC .......................................................... 705/1.1

(58) Field of Classification Search ................ 705/1, 1.1; 706/1, 52
See application file for complete search history.

(56) References Cited

U.S. PATENT DOCUMENTS 6,643,799 B1 * 11/2003 Bonissone et al. .............. 714/26
6,999,990 B1 * 2/2006 Sullivan et al. ............... 709/205

OTHER PUBLICATIONS

Sokolowski, Modeling the decision process of a joint task force commander, May 2003.*
Hall—Decision making in the information age—moving beyond the MDMP, Sep./Oct. 2000, Field Artillery.*
Sternberg, Environmental effects on cognitive abilities, Erlbaum associates, 2001, p. 228-231.*
Hall—Decison making in thte information age.*
J. Yen, J. Yin, T. Ioerger, M. Miller, D. Xu, R. Volz; "CAST: Collaborative Agents for Simulating Teamwork," Proceedings of the Seventh International Joint Conference on Artificial Intelligence, pp. 1135-1142, Aug. 2001.
W. Warwick, C. Brockett, S. McIlwaine, R. Hutton, B. Hahn; "Incorporating Models of Recognition-Primed Decision Making in Computer Generated Forces,"Simulation Interoperability Standards Organization (SISO), Mar. 2002.

* cited by examiner

*Primary Examiner* — Jami A Plucinski
*Assistant Examiner* — Sangeeta Bahl
(74) *Attorney, Agent, or Firm* — Gifford, Krass, Sprinkle, Anderson & Citkowski, P.C.

(57) ABSTRACT

Collaborative agents for simulating teamwork (CAST) are provided with a recognition-primed decision (RPD) model, thereby enhancing analysis through linking and sharing information using knowledge and experience distributed among team members. The RPD model is integrated within a CAST architecture to the extent that agents can proactively seek and fuse information to enhance the quality and timeliness of the decision-making process. The approach, which is applicable to both human assistants and virtual teammates, can approximately track human's decision-making process and effectively interact with human users. A disclosed example relates to teams of agents analyzing terrorist activities.

17 Claims, 4 Drawing Sheets

AGENT-BASED COLLABORATIVE RECOGNITION-PRIMED DECISION-MAKING

REFERENCE TO RELATED APPLICATION

This application claims priority to U.S. Provisional Patent Application Ser. No. 60/588,516, filed Jul. 16, 2004, the entire content of which is incorporated herein by reference.

GOVERNMENT SPONSORSHIP

The research carried out in connection with this invention was supported in part by Grant No. DAAD19-01-1-0504 from the United States Army. The United States government may have rights to the subject matter of this application.

FIELD OF THE INVENTION

This invention relates generally to decision-making and, in particular, to providing collaborative agents for simulating teamwork with a recognition-primed decision (RPD) model, thereby enhancing analysis through linking and sharing information using knowledge and experience distributed among team members.

BACKGROUND OF THE INVENTION

Human teamwork is often threatened by the inclination of information overload [18] and the complexity of distributed cognition [2]. However, most applications for dynamic domains require members of a human team to cooperate effectively in information gathering, information fusion, sense-making, information delivering, and group decision makings. It is thus highly critical to investigate novel ideas and develop effective solutions to reduce the threats from information overload and distributed cognition to an acceptable level.

Take the domain of homeland security (HS) as an example. The cognitive demands in HS are complex, dynamic, and time pressured:
1. An HS team has to process voluminous amount of information that is dynamic, changing, and uncertain in nature;
2. The data, information, and knowledge resident within the broad scope of homeland security situations are distributed across people, objects, tools, and environments. For example, one member of a HS team may be an expert in terrorist organizations, while another is an expert in biological threats, and they may process information using completely different databases and tools;
3. Team members can have differing levels of access to various information sources, due to security concerns often associated with their roles and responsibilities. For example, an analyst may have access to satellite images while another analyst may have access to intelligence reports;
4. To enable early detection and successful processing of potential terrorist threats, team members must effectively work together to quickly make sense of the information from multiple sources.

These unique and complex challenges can significantly hamper the quality and the timeliness of decision-making in homeland security areas, which can have extraordinary and possibly catastrophic consequences.

The approach adopted in this invention is to develop a cognitive-aware software system that can act as decision aids of human team members in varying ways, including context-sensitive anticipation of others' information needs, proactive information/experience sharing, and collaborative situation assessment.

There has been much theory and research presented with respect to team cognition, naturalistic decision-making, and collaborative technology [8] in relation to real world, complex domains of practice. However, there has been very little work in looking at cognitive agent architectures as a means to assist and support distributed team cognition and decision-making. This is particularly true as applied to naturalistic decision-making theory (e.g., Klein's RPD framework [4]).

As one examines naturalistic decision-making in complex domains, there are several factors that are salient to consider. One theory that attempts to understand the dynamics of team cognition introduces the concept of a "shared mental model" [1][16] which refers to an overlapping understanding among members of the team regarding their objectives, structure, process, etc. Effective teams exhibit shared mental models wherein members can anticipate the needs of and proactively offer help to other teammates [3]. Along this direction, Yen et al. implemented a team-oriented agent architecture called CAST [19], which realized a computational shared mental model and allows agents in a team, whether they are software agents or human agents, to anticipate the potential information needs of teammates and proactively assist them.

Background on Recognition-Primed Decisions (RPD)

Assuming that satisfying reflects human behavior better than optimizing [13], the RPD model argues for finding the first workable solution through recognizing the similarity between the current decision situation and previous decision experiences. The RPD model divides a decision-making process into two phases [5]: recognizing which course of action makes sense for the current situation; then evaluating the course of action by imagining it.

Feature-matching and story-building are two diagnostic strategies employed in the first phase to develop situation awareness. Feature-matching is used first, by which a decision maker tries to match the set of observed cues or pattern of cues with the pre-determined domain-dependent features. In case feature-matching cannot provide an adequate situation resolution due to lack of information or experience, story-building is adopted to construct a story (i.e., a causal sequence of events) that can link the pieces of observed and available information into a coherent form. The story provides an explanation of how the current situation might have been emerging.

To explain the observed events, both strategies require that a decision maker determine expectancies (prescribe what to be observed next as the situation continues to evolve) and relevant cues (what the decision maker needs to pay attention to) pertinent to the current situation, and make assumptions for the missing information. A decision maker may have misinterpreted the situation but does not realize it until some expectancies have been violated. Thus, expectancies serve as gate-conditions for continuing working on the current recognition; further diagnosis is triggered (to gather more information) whenever the expectancies conflict with new observed facts. Assumptions serve as slots for gaining confidence; the recognition is more justified as more available information validates the assumptions. To better explain the observed events, story-building also allows a decision maker to explore several potential hypotheses and evaluate how well each of them fits the observations.

In addition to expectancies and relevant cues, the recognition phase can also result in a set of plausible goals (which goals make sense) and courses of action (what actions worked before in similar situations). The main task in the second phase is to carry out singular evaluation by imaging how the course of action will evolve. The decision maker may need to adjust the course of action, or reject it and look for another option.

There have been several attempts in computerizing the RPD model. For example, there are RPD-related studies that used long-term memory structure [17], fuzzy techniques [12], and neural networks [7] to represent experiences. The Navy DSS system [9] implements a functional model that allows a decision maker to explore alternative hypothesis. There are also attempts in integrating RPD with agent technologies [10][14][17][20]. For example, Norling et al. [10] explored the ways of using RPD to enhance BDI agents so that the simulations of human societies would be more realistic. Warwick, et al. [17][20] investigated a computational approach to RPD to represent human decision-making for concept exploration, analysis, or evaluation. However, all of these attempts have ignored the support of team collaboration in the RPD decision-making process. This actually leaves the most exciting part of the RPD model as an open research issue: how a team of agents, with a shared computational RPD process, are supposed to work together in collaboratively developing situation awareness, in effectively anticipating others' information needs relevant to cues and expectancies, and in proactively sharing information to make better decisions under time pressure.

Others have been investigating (a) the use of software agents for robust battlefield simulation (e.g., [21]); (b) the use of agents as aids to information filtering in a decision environment (e.g., [22][23]); (c) shared situation awareness (e.g., [24]), cognitive models of situation awareness (e.g., [25]); and (d) teaming with automation (e.g., [26]). The collaborative-RPD model implemented in R-CAST is linked to but also distinguished from the existing work in important ways. First, R-CAST is the first RPD-enabled agent architecture designed for supporting teamwide collaborations (including human-agent and agent-agent collaborations). With collaboration in mind, we take an intensive view of the recognition phase of the RPD process and focus on the investigation of how proactive information exchange among teammates might affect the performance of a decision-making team. Second, R-CAST agents can proactively reason across decision spaces, seek missing information from external intelligence sources, exchange relevant information among teammates, and monitor an on-going decision against potential expectancy. Third, the "cognitively-aware" agents, as teammates or decision aids, each assigned to a specific functional area, can be used to assist human teams (e.g., military staff) in developing shared situation awareness while balancing information requirements against the dynamic and time sensitive decision-making process.

Case-based reasoning (CBR) is another psychological theory of human cognition [27], focusing on the process of reminding (experience-guided reasoning) and learning. While there is no clear line between RPD and CBR as far as their process models are concerned (e.g., both cover experience retrieval, solution adaptation and evaluation), they differ in several important aspects. First, RPD originates from studies about how human experts make decisions under time pressure [5][6]. Experiences in RPD are prior decision-making cases, while experiences in CBR can be of any kind. From such a perspective, RPD can be taken as a subfield of CBR. Second, while storage and retrieval are central aspects of CBR, research on RPD is more concerned with the iterative process of recognition refinement (i.e., developing better situation awareness through information gathering). Third, RPD systems ought to be aware of time stress and make as better decisions as time permitted, but this is not a requirement on CBR systems. In addition, the Collaborative-RPD model implemented in R-CAST takes a more extensive view, focusing not only on human-centered teamwork in making decisions, but also seriously addressing related issues such as collaborative situation awareness and expectancy monitoring.

Background on CAST

CAST (Collaborative Agents for Simulating Teamwork) is a team-oriented agent architecture that supports teamwork using a shared mental model among teammates [19]. The structure of the team (roles, agents, subteams, etc.) as well as team processes (plans to achieve various team tasks) are explicitly described in a declarative language called MALLET that was designed for this purpose. Statements in MALLET are translated into PrT net (a specialized Petri-Net), which uses predicate evaluation at decision points.

CAST supports predicate evaluation using a knowledge base with a Java-based backward chaining reasoning engine called JARE. The main distinguishing feature of CAST is proactive team behavior enabled by the fact that agents within a CAST architecture share the same declarative specification of team structure and process as well as sharing an explicit declaration of what each agent can observe. Therefore, every agent can reason about what other teammates are working on, what information they need, whether they can observe the information required to evaluate a precondition, and hence what information might be potentially useful to them. As such, agents can figure out what information to proactively deliver to teammates, and use a decision theoretic cost/benefit analysis of the proactive information delivery before actually communicating.

As shown in FIG. 1, a CAST agent is composed of six components: Reasoning Engine (RE), Shared Mental Model (SMM), Individual Mental Model (IMM), Team Process Tracking (TPT), Proactive Behavior (PB), and Goal Management (GM). Based on the current states of SMM and IMM, the RE triggers appropriate algorithms in TPT, PB and GM to monitor the progress of team activities, to select goals to pursue, to anticipate others' information needs and to proactively help them. The execution of these mental operations will further affect the evolution of the shared and individual mental states.

The proactive information delivery behavior of CAST agents is based on the reasoning of others' information needs. CAST supports three kinds of information-needs. (1) Built-in information needs: each agent needs to know others' progress in order to maintain the SMM regarding the dynamic status of a team process. Such built-in information-needs provide the cohesive force that binds individual CAST agents together as a team. (2) Inferred information needs: CAST agents can extract the pre-conditions, termination conditions and constraints associated with (sub-)plans in a team process, and establish partial information-flow relationships based on incomplete knowledge. These partial relationships can be further refined as the team allocates tasks at run time. (3) Communicated information needs: an agent treats requests of information from others as explicit needs.

SUMMARY OF THE INVENTION

This invention is directed to providing collaborative agents for simulating teamwork with a recognition-primed decision (RPD) model, thereby enhancing analysis through linking and sharing information using knowledge and experience distributed among team members.

In accordance with the invention, the RPD model is integrated within the CAST architecture to the extent that agents can proactively seek and fuse information to enhance the quality and timeliness of the decision-making process. The approach, which is applicable to both human assistants and virtual teammates, can approximately track human's decision-making process and effectively interact with human users.

The invention is particularly valuable to distributed teams of human and software agents analyzing terrorist activities. It is also applicable to enhancing the decision-making of a distributed first responder team, a distributed command and control team involving multiple echelon units in a net-centric warfare, and other domains involving team decision-making under time pressure for interpreting a large amount of information about a highly dynamic environment.

DETAILED DESCRIPTION OF THE INVENTION

Figure 1:
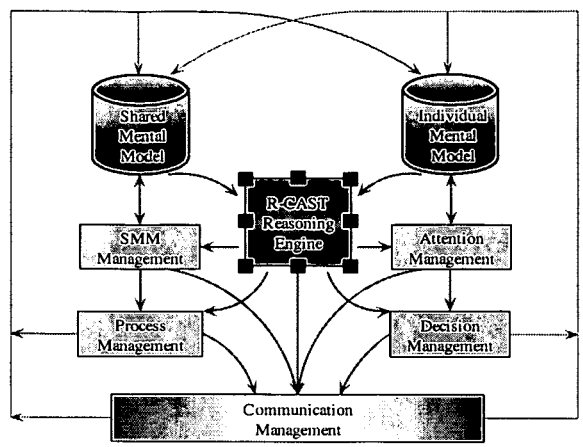
FIG. 1 illustrates the R-CAST architecture.

Broadly, this invention resides in a Collaborative RPD model (Section VI.A) and the R-CAST software architecture (Section VI.B) that is based on a shared decision-making process among team members. An anti-terrorist scenario and an application are also disclosed in Section VII and VIII, respectively, to show how R-CAST agents can help human teams make decisions.

The Collaborative RPD Model

In an effort to use RPD for collaborative decision-making in teamwork settings, an objective of this invention is to establish a computational collaborative RPD model, and empower intelligent agents with such a model so that they can help a decision-making team to better collaborate with each other for effective team decision-making. Collaborative RPD is quite different from an individual RPD model. Collaborative RPD is more complex because the process involves interactions between the decision-making agent and its teammates (both human and intelligent agents). However, collaborative RPD is also much more powerful because the decision-making agent can leverage information processing capabilities of others (such as information gathering, filtering and fusing). Thus, according to this invention, decisions can be made with better quality (e.g., in terms of timeliness or correctness). The following description focuses on (1) types of decision-making tasks, (2) collaborative situation awareness, (3) collaborative story building, and (4) collaborative expectancy monitoring.

Types of Decision-Making Tasks

Making decisions on what to do next is a task at an abstract level above domain tasks. Each decision-making task has certain knowledge (expertise) requirements on the decision maker. Two decision-making tasks belong to the same type if they place the same knowledge requirements. For example, Hollenbeck et al. [28] described a scenario involving a four-person naval command and control team. The team needs to monitor the airspace in the vicinity of an aircraft carrier battle group, and to decide how to respond to the incoming air targets. This type of decision-making requires two forms of expertise: (a) the ability to measure and translate raw attributes (e.g., speed, altitude, angle, IFF, etc) of an aircraft into internal opinions (cues) regarding how threatening the aircraft is, and (b) the rules specifying how to combine cue values to determine the level of threat.

In addition, decision-making in human society is typically connected with societal hierarchies; a higher-level decision-making task usually depends on the results of lower-level decision-making tasks. In order to support multiple-level decision-makings, in our model, we use the concept of "decision spaces" to organize experiences hierarchically according to decision types: experiences related to one decision type are maintained in one decision space or experience knowledge base (EKB).

Treated as such, decision-making and information fusion can be tightly coupled at multiple levels, if we view the process of decision-making as a process of fusing input information into decision results. This is also flexible for supporting teams where knowledge and expertise are distributed among team members. For instance, members of an anti-terrorist analyst team may have different access to various information sources due to security concerns or due to their roles and responsibility in the team. The team members can make decisions at different levels relative to their past experiences.

What is also important is that an agent can be involved in multiple decision tasks, which may or may not have relations. It is thus necessary for an RPD-agent to be able to effectively manage multiple attentions (RPD processes). For flexibility, we leave the issue of attention management open to the designers of agent architectures.

Now we come to the experience representation. Each experience has four parts: cues, goals, course of actions, and expectancies. An experience can be formally denoted as $e_i = <C_i, G_i, E_i, A_i>$, where $C_i$, $G_i$, and $E_i$ are collections of predicates, and $A_i$ is a set of plan names, referring to predefined courses of actions. Let the collection of cues consider by a decision space EKB be $C_{EKB} = U_{e_i \in EBK} C_i$.

In our model, no restriction is placed on the sources of decision tasks. It could be a pre-specified step in a plan, could be a request from a human partner or other teammates, or could be dynamically identified by an agent itself. Responding to a decision task t, an RPD-agent will first follow the procedure below to initialize the RPD process:

From the current situation, determine the collection Ft of features that are potentially relevant to the task;

Explore the decision space hierarchy to pick one that is applicable to the decision task. A decision space $EKB_j$ is chosen and fixed in the rest of the RPD process if Ft can be covered by $C_{EKBj}$. However, the determination of Ft itself is a high-demanding cognitive task, and the selected decision space might not be the desired one. Thus, an internal mechanism of decision-space adaptation is highly needed so that the RPD-agent can recover from wrong selections of the decision space.

If there is no decision space applicable to t, i.e., the RPD-agent cannot handle the task due to lack of expertise, this agent has to find one competent RPD-agent and transfer the task to that agent.

The agent whoever makes an commitment to a decision task will then let others know so that the others can help in the rest of the decision-making process. Those agents who also have the required decision-making knowledge (they thus know what is needed in making that decision) can proactively help on task t and lower-level decision tasks, if any. Although those agents who do not have the required knowledge cannot easily anticipate the decision maker's needs, they can also provide help if they receive information requests for developing situation awareness.

Now we look at the organization of experiences within a decision space. We can formally define a refinement relation ($\leqq$) among experiences (recognitions). For any experiences $e_i = <C_i, G_i, E_i, A_i>$ and $e_j = <C_j, G_j, E_j, A_j>$ in a decision space, $e_i \leqq e_j$ iff $C_i \subseteq C_j$. This is a rather weaker requirement: an experience is a refinement of another if it considered more information (cues) in the recognition. A stronger refinement relation can be defined in terms of additional relations between the other components. For instance, for some types of decisions, it may make sense to define: $e_i \leqq e_j$ iff $C_i \subseteq C_j$, $G_i = G_j$, and $A_i < A_j$, where '<' is sequence prefix relation: an experience is a refinement of another if it considered more information (cues) in the recognition, both share the same goals, and the course of actions associated with $e_i$ is simply the prefix of what is associated with $e_j$. From such a perspective, experiences in an EKB can be virtually viewed as being partitioned by some experience refinement relations.

Collaborative Situation Awareness Driven By Relevant Cue Analysis

The term "cue" refers to an agent's internal representation of the decision situation. Cues are higher-level abstractions of the elementary data or synthesization of lower-level information. For example, internally an agent may only care the fuzzy category (e.g., high, medium, low) rather than the real value of an object's velocity. Generally, a cue can be the root of several tree-like information-dependence structures, which describe the ways how the cue is abstracted from low-level information.

An agent can derive information requirements regarding the current decision task from the cues under its consideration. Agents in a team may play different roles when investigating a situation.

The decision maker agent (DM), while trying to synthesize the available information into appropriate cues, may not be able to attain a sufficient level of situation awareness due to lack of critical information. For every unknown cue, the DM can ask for help from some potential information providers. Upon receiving information from teammates, as well as synthesize the new acquired information to develop better situation awareness, the DM could also learn new information-dependence trees from teammates, and revise experiences in its EKB to incorporate additional cues being considered by other agents.

Teammates who have the experiences pertinent to the current task can proactively tell the decision maker (DM) about the information relevant to the cues that need to be considered. Since an agent and the DM agent may have different EKBs and information-dependence structures, the teammate can (1) inform the DM agent about the cues that have been synthesized in ways beyond the DM's existing expertise, (2) share experiences by informing the cues that are considered in its EKB, but may not in the DM agent's.

Teammates who have no experience for the current task can help the DM agent upon being requested of certain information. Here, an teammate could reply the DM agent with information that is synthesized in a way different from the structure being considered by the DM agent.

It is worth noting that the information exchanged among RPD-agents is of form <cue, dependence-structure>. This has two benefits. First, in doing so, the agents are not only requesting/sending information relevant to the cue, they also explicitly requesting/sending information that is indirectly related to the cue according to the accompanying dependence-structure. In essence, the dependence-structure establishes an information use context; an agent can help the information needed with all the information matched with the nodes of the dependence-structure that are marked as 'unknown' by the needer. Second, an agent may respond to an information request using a dependence structure different from the one being used by the requesting agent. Accordingly, the agents in a team can exchange and learn expertise about information-dependence structures from each other. This can progressively enable the agents to better anticipate others' information needs.

The investigation process is the key to evolving recognitions. It can be an anytime algorithm; the decision-making agent can trigger the feature-matching function at any point of the investigation process, as long as the agent has attained a satisfactory level of awareness of the current situation.

Collaborative Story Building

While feature matching is used to find past experiences that most match the current situation, story building is used when agents are experiencing unfamiliar situations. From another perspective, feature matching is to build a story for the current situation using 'templates' worked before, while story building is to construct a story from scratch.

Story building also involves information gathering, but it is more than cue-driven information investigation, because the agents are still unclear about what cues to investigate. Therefore, the key is to identify a collection of cues which the team needs to pay attention to. Our model adopts a combination of two mechanisms: hypothesis exploration and experience synthesization.

A hypothesis could be an abstract story (e.g., there is a chance that City Y is facing some terroristic attack within 2 weeks), or a plausible intention (e.g., the object moving toward Building Z is probably hostile). To support collaborative hypothesis exploration, we employ the idea of multi-party conversation, where all the agents can hear the messages exchanged in a team, even though some are not necessarily the intended audiences. For instance, agent B can comment on agent C's messages directed to agent A. In doing this, first, the decision maker agent (DM) can initiate a conversation to collect potential hypotheses that the team needs to further investigate. The team can use different strategies (e.g., agreed by most, proposed by a creditable agent, suggested by human partners, etc.) to determine the hypotheses that reflect the current situation best. To explore a specific hypothesis h, the team members are involved in conversations under four contexts:

Given that h is true, each agent, based on its expertise, infers what things should/not have happened, and proclaim to others for confirmation. A thing that should have happened but actually not, or the other way around, shows a negative evidence to h;

Given that h is true, each agent infers what things should/not be doing now, and proclaim to others for confirmation. A thing that should be doing but actually not, or the other way around, shows a negative evidence to h;

Given that h is true, each agent infers what things should/not happen later, and proclaim to others for validation. A thing that should happen within a minute but actually not as expected, or the other way around, shows a negative evidence to h;

Given that h is true, each agent draws reasonable conclusions of form "X must/not be Y" (e.g., the unidentified object must be a neutral force; City P must have an airport) and proclaim to others for verification. In case that X must be Y but actually not, or the other way around, shows a negative evidence to h.

All these four kinds of claims could be associated with a value that indicates the claiming agent's confidence degree.

To evaluate a hypothesis, the DM agent needs to consider both the positive and negative evidences collected in the multi-party conversation, and to reconcile conflicting conclusions drawn by different team members, if any. Certain human-adjustable thresholds can be used to judge whether the hypothesis applicable to the current situation. If not, the agents continue to explore another hypothesis until find an acceptable one. If yes, the DM agent can then generate a pseudo-experience in the following way: (1) use the proven hypothesis to produce goals, the fulfillment of which could prevent the situation from evolving toward undesired direction (e.g., to invalidate a hostile attempt, to protect a vulnerable place); (2) use the information gathered to produce cues, expectancies and construct a course of actions (COA). Once it is proved that the COA works, the pseudo-experience will be stored as a valid experience for dealing with ensuing similar situations. Agents can also learn from unworkable pseudo-experiences so that they would not make the same mistakes when similar situations occur.

Experience synthesization is used when two or more past experiences can be combined together to deal with an unusual situation. Synthesization could be based on experiences from single or multiple agents, and the four components of a synthesized experience are typically the coupling of the corresponding parts of the input experiences.

Collaborative Expectancy Monitoring

After an RPD-agent makes a recognition, it will continuously monitor the associated expectancies until the completion of the selected course of actions. Expectancy monitoring is one of the key features to support adaptive decision-makings. A DM agent can subscribe information relevant to the expectancies that need to be continuously monitored. Such collaborative expectancy monitoring can take full advantage of the team's distributed cognition, so that the DM agent can terminate the actions resulted from a wrong recognition at the earliest opportunity.

First, expectancies can be used to initiate a complete new decision. An expectancy states what will happen, serving as a gate-condition for keeping following the current recognition. Some expectancies may be so crucial that whenever they conflict with the new observed facts, it indicates the decision maker has heavily misinterpreted the current situation. In such cases, the RPD-agent has to diagnose the current recognition, re-considering the whole space of the active EKB for another time.

Second, RPD-agents can use expectancies to refine a decision, leveraging some structures within the active EKB. The invalidation of some expectancies may indicate that the once workable recognition is no longer applicable to the changing situation. The already executed part of the selected course of actions may still make sense, but the rest part has to be adjusted. In such cases, the RPD-agent can start another round of recognition, using the experience refinement relation described earlier to develop a better solution.

The R-CAST Architecture

The R-CAST architecture implements the Collaborative-RPD model described above. FIG. 1 shows an abstract view of the R-CAST agent architecture.

Shared Mental Model (SMM):

SMM stores the knowledge and information that are shared by all the member of a team. The SMM implemented in R-CAST contains four components: team processes (including the RPD process), team structure, shared domain knowledge, and information-needs graphs. The shared domain knowledge may include inter-agent conversation protocols and social norms to follow, domain-specific inference knowledge, etc. An information-needs graph maintains a dynamic, progress-sensitive structure of teammates' information-needs, ensuring that only relevant information is delivered to the right entity at the right time. The SMM Management module is responsible for updating and refining the SMM and may entail inter-agent communications to maintain cross-agent consistency of certain critical parts of team members' SMMs.

Individual Mental Model (IMM):

IMM stores those mental attitudes privately held by individual agents. It may contain the agent's domain expertise pertinent to its role in the team and its beliefs about the dynamic world and other team members. It is constantly updated by sensor inputs from the environment and communication messages received from other agents.

Attention Management (AM):

An agent may have multiple goals to pursue. An R-CAST agent uses the AM module to manage the attentions under its concern. For instance, based on the agent's situation assessment and cooperation requests from other agents, the agent may pay more attention to one goal, or suspend the pursuit of one goal and switch to another. More specifically, a team process may involve various kinds of decisions (e.g., working under multiple contexts). Since each decision task will trigger one RPD process, it is the AM's responsibility to effectively and carefully adjust the decision-maker agent's attentions on decision tasks.

Process Management (PM):

Once a goal is committed, the Process Manager will choose a plan (COA) that can bring about the goal and create a team process. The PM is also responsible for orchestrating team members' behaviors so that they could collaborate smoothly both when everything is progressing as planned and when something goes wrong unexpectedly. More specifically, in normal circumstances, PM ensures all the team members behave strictly according to the committed (intended) plans, and synchronize their behaviors whenever necessary. When agents encounter in exceptional circumstances, they use their PM modules to collaboratively adapt to changes in the environment (exception handling).

Decision Management (DM):

An R-CAST agent may trigger the RPD decision process in one of three modes: 1) based on human's recognition, 2) based on agent's recognition, or 3) based on decision points explicitly specified in a plan. In the first mode, the need for making a decision is first recognized by a human based on his expertise and his assessment of the current situation. He then delegates the identified decision-making task to his assistant agent, who will trigger the RPD process and inform other teammates of the decision-making request so that they can collaborate in making the decision. In the second mode, the need for making a decision is recognized by an agent based on its situation assessment. Running in this mode, an R-CAST agent needs to continually pay attention to the changes of cues or patterns of cues in order to recognize the emerging decision tasks. In the third mode, the needs for making decisions are explicitly specified in a team plan as fixed decision points, and the RPD process is triggered whenever agents reaches a decision point. Generally, an R-CAST agent running in the first mode can evolve into a system in the second mode, after the agent gain enough expertise (e.g., cues to consider) for recognizing decision-making tasks through learning from humans. Similarly, a system operating in the second mode can further evolve to act in the third mode.

R-CAST Reasoning Engine (RRE):

RRE is the kernel of the R-CAST architecture. RRE anticipates other team members' relevant information needs based on the progress information of team activities (from SMM); infers tacit information needs based on causal link analysis; tracks teamwork progress, if needed; and initiate information seeking and sharing to achieve shared understanding of situations and team activities.

Communication Management (CM):

CM governs inter-agent communications. An agent may either initiate a new conversation context or simply follow existing ones. The manager organizes related messages into conversation sessions, and monitors the development of on-going conversation protocols. CM has algorithms for proactive communication among teammates. Upon acquiring new information from the environment, CM checks whether the new information matches some teammates' future information-needs (from RRE). If there is a match, the agent will consider sending out the new information to the corresponding needers proactively.

Figure 2:
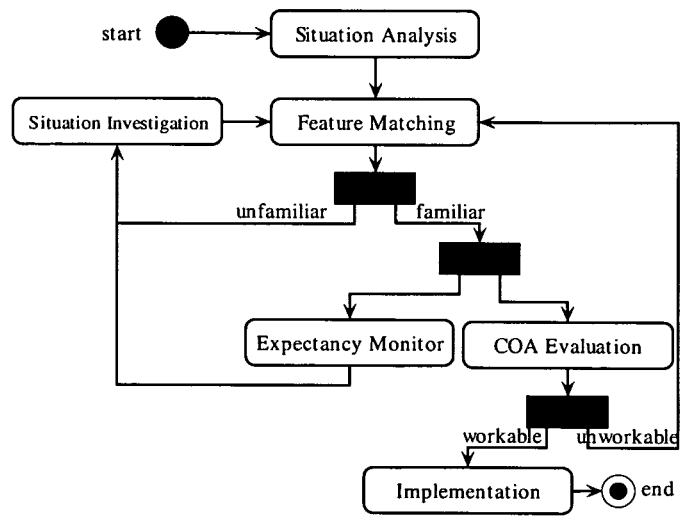
FIG. 2 shows the implemented RPD process.

R-CAST has realized a set of functions corresponding to the main steps of the RPD model: situation analysis, recognition, evaluation, COA implementation, and expectancy monitoring. FIG. 2 shows the implemented RPD process.

Situation Analysis

In responding to a decision task, an R-CAST agent first explores the decision space hierarchy to choose one that is most applicable to the decision task by comparing the current situation with the cues considered by a decision space. In case that this R-CAST agent cannot handle the task due to lack of expertise, it will try to find a competent R-CAST agent and transfer the task to that teammate. The agent whoever makes a commitment to a decision task will also let others know so that they can help in the rest of the decision-making process.

Recognition

The recognition phase involves three sub-processes: investigation, feature matching, and story building.

Investigation is the process for collecting missing information; it is the key to evolving recognitions. Given a task, if an agent has the capacity and capability to gather information, it can activate an information-seeking plan. For example, an agent can launch a helicopter to scout enemy information. If the agent is incapable or has insufficient resources to do so, it can send an information request to others. In addition, other agents who have anticipated the decision maker's information needs may also proactively provide relevant information to the decision maker.

Feature Matching. While an R-CAST agent is gathering information, it also triggers the feature matching function to check whether there are past experiences similar to the current situation. Because the information regarding the current situation is recorded in the agent's KB, the feature matching process simply iterates over the experiences in the active EKB and casts queries to the agent's KB with the cues to be evaluated. The experiences with the most number of cues satisfied with respect to the KB are the recognition results.

Story building: When building a novel story to explain the current situation, the decision-making agent typically works interactively with its human user in getting clues and causal links, and works collaboratively with its teammates in obtaining relevant information. The decision-making agent, not being able to match the current situation with any of its past experience, displays the current situation to its human user.

The human user, based on his expertise, can input assumptions (new cues to consider), or suggest information fusion rules by linking pieces of information together, or indicate verifiable expectancies. The decision-making agent then tries to explore the assumptions by proactively collecting information that supports the assumptions from other teammates, pay attentions to the expectancies to confirm whether the situation is evolving towards the anticipated direction. Such interactions will help the human in better understanding the global situation so that he can suggest better solutions to the situation. The solutions then will be combined together with the relevant cues, goals, and expectancies into a new experience and added into EKB.

Evaluation and Execution

Evaluation is a process for selecting a workable course of action. For human decision makers, evaluation is a mental simulation process: people imagine how the course of action may evolve and judge whether the relevant goals can be achieved. For an R-CAST agent, we simplify the process by simulating the effects of the selected plan (i.e., the chosen course of action) in the knowledge base (KB). First, the RPD-agent checks whether the preconditions of the selected plan is satisfiable with respect to its KB. If so, the agent asserts the effects of the plan into its KB and uses the KB engine to check whether the relevant goals become true. If a plan can pass such a two-phase KB evaluation, it is deemed as a workable solution for the current situation and the agent will coordinate with other teammates to execute the plan. Otherwise, the agent has to make another round of recognition, going through the RPD process again.

Having recognized the current situation, the attention of the decision-making agent splits into two parallel tasks: expectancy monitoring and option evaluation. Being informed of the recognition result, the other agents can help the decision-making agent in detecting changes to the environmental variables relevant to the expectancies, and inform the changes proactively. Suppose E is the collection of expectancies resulted from the recognition. In case that E is anomaly, the decision-making agent needs to make a further diagnosis. If further clarification is needed (the situation has been misinterpreted heavily), the agent has to re-consider the current situation. Otherwise, the agent needs to do feature matching or story building again by considering the violated expectancies and new obtained information. Expectancy monitoring also works when the agent is evaluating or implementing a course of action. In any case, the agent needs to re-assess the situation when anomaly occurs.

During the option evaluation phase, a human user through the interface can adjust the course of action being evaluated to satisfy the goals. After getting a workable course of action, the decision-making agent informs others of the solution so that they could act on the actions collaboratively.

Therefore, we have implemented an iterative, computational RPD model in R-CAST, which explicitly incorporates the idea of "recognition refinement", and supports situation reconsideration during action execution phase. The computational model is also much more flexible for us to investigate the time pressure issue. Since R-CAST agents can make a sequence of decisions (the length of the sequence is restricted by the external time pressure), with one decision refining the preceding ones, it can always return an acceptable decision relative to the timing constraints. This virtually guarantees no critical decision is missed under stress situations. Pseudo-code of the iterative algorithm for RPD is as follows:

```
IterativeRPD(KB, EKB)

/* en is of form hCn;Gn;En;Ani. EC/EN stores
crucial/non-crucial expectancies being invalidated. */
    1. SituationAnalysis( );
    2. CS = GetCurrentSituation(KB);
    3. e0 = Recognition(CS,EKB);
    4. InformRecognition(e0);
    5. For (i=0; ; i++)
    6. [EC,EN] = validating(Ei);
    7. If (timeout is true)
    8. goto 1; /*prepare for the next task*/
    9. CS = GetCurrentSituation(KB);
   10. If (EC is not null)
   11. ei+1 = Recognition(CS,EKB);
   12. InformRecognition(ei+1);
   13. Else If (EN is not null)
   14. ei+1 = Re⁻ningRecognition(CS,EKB);
   15. InformRecognition(ei+1)
```

Figure 3:
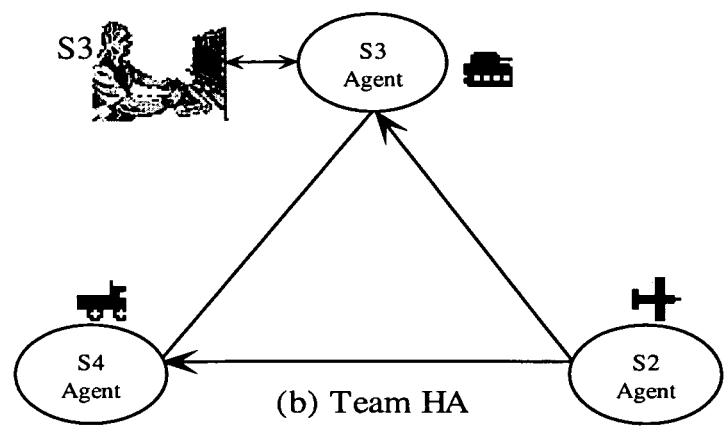
FIG. 3 shows a mixed human/agent team.

The computational RPD model implemented in R-CAST is also a collaborative model. As shown in FIG. 3, each R-CAST agent (e.g., S3 agent) may have a human partner, who can override the decisions suggested by the R-CAST agent. An R-CAST agent can also team up with other R-CAST agents and interact with them. As far as a specific decision task is concerned, if one RPD-agent who has the required expertise is designated as the final decision maker, all the other R-CAST agents will be supporters (of course, the supporters may be the final decision makers for other tasks). In the current implementation, a decision maker agent can collaborate with its human partner and the other supporting agents along the RPD process. Here we mainly focus on exchanging information relevant to establishing situation awareness for decision-makings.

A decision maker agent can derive its information needs regarding the current decision task from the cues considered in the active experience base (EKB) and the expectancies of the experiences that are found similar to the current situation. The derived information needs can be satisfied in three ways. First, teammates can proactively provide the decision maker agent (DMA) with information relevant to the cues that the DMA is considering. As we mentioned earlier, this happens when a teammate has been informed of the decision task, and the teammate has the required expertise (e.g., its experiences overlap with the DMA's). Second, in cases where agents do not have overlapped experiences, the decision maker may explicitly request information from teammates. Here, 'ask-reply' becomes a handy way to compensate the limitations of proactive communication. Third, the DMA can subscribe information relevant to the expectancies that need to be continuously monitored. When the DMA informs other teammates about the recognition, it is also implicitly requesting them to monitor the expectancies. Such collaborative expectancy monitoring takes full advantage of the team's distributed cognition, so that the DMA can terminate the activity resulted from a wrong recognition at the earliest opportunity.

Concept Illustration: Anti-Terrorism Scenario[1]

[1] This is a fictitious example for illustrative purposes only. It does not represent actual practices or information from the Central Intelligence Agency (CIA) or police departments.

Suppose the CIA recently captured a terrorist X in city A. Based upon an interrogation, the CIA learned that X is an expert on chemical weapons, and X has a partner Y who also knows how to use lethal chemicals. However, the CIA could not find out the whereabouts of Y. As a routine approach, the CIA posts Y's information as a wanted notice. Meanwhile, a plant reported to police department PD1 the loss of a truckload of phosgene, a chemical ingredient for making plastics. Since PD1 did not know that phosgene can also be used in making chemical weapons, it simply set up a routine case (steal industrial material) for investigation. As a matter of fact, terrorist Y was trying to plot a chemical attack.

R-CAST agents can be used in such a scenario to help the investigation agencies prevent this attack. We assume all the involved agencies (each has an R-CAST assistant agent, which captures the interests, expertise, and experiences of the agency) form a layered team structure. For instance, the field offices like the CIA, PD1 and FBI are at the bottom layer, professional analyzing agencies (e.g., chemical agent specialists, weapon specialists, etc.) lie at the second layer, and there is a command and control center at the top layer.

In the above scenario, when obtaining intelligence on Y, the CIA contributes the knowledge base of his assistant agent. Knowing that the agency of chemical specialists (ACS) is interested in such information, the CIA's agent proactively informed the ACS's agent about Y. Similarly, PD1's agent also informed ACS about lost of the chemical material. Once ACS's agent received these two pieces of information, it tries to make connections: Y might attack with the chemical material. However, ACS's agent could not create a complete story because it was unclear about the time and place for the attack. Moreover, from ACS's knowledge, in order to launch the weapon Y needs a projectile such as a missile or a small aircraft.

Based on this partial story, ACS's agent issued a request for missing information (about time, place, and projectile) to the other agencies at the second layer. Fortunately, the agency of weapon specialists (AWS) had a report from an FBI field office that a small plane was stolen recently. By comparing the ACS's information request, AWS's agent found a match and informed ACS's agent about the incident of the aircraft. At that point, the ACS's agent could establish a more convincing story that there would be a potential attack by an aircraft armed with a chemical weapon. ACS's agent sent this partial story to the command center (C2). C2's agent tried to make sense of the partial story from ACS by exploring the possible attacking time and place. An upcoming Christmas celebration event at a major city B would involve a large number of people. Hence, C2's agent could issue a warning to the government of city B about the possible attack.

This collaborative story building approach is based on a multiple accumulation of evidence. The system incrementally develops stories from bottom up by considering the useful information from teammates. This prevents the agents at a higher level from being overloaded with huge volume of information because irrelevant information can be filtered out at a lower level. Alternatively, a top-down approach can be employed, where the center agent first initiates an abstract story, and then shares the story with other agents so that they can collaboratively work on building the same story. A hybrid approach that combines the above two may be more practical in complex situations.

An agent architecture based on collaborative RPD responds to the challenges for HS decision-making teams in three important ways. First, terrorist detection and investigation rely on the capability of recognizing critical patterns from the current situations. The collaborative RPD model disclosed herein is per se recognition-primed. To achieve an improved situation awareness, R-CAST allows agents in a team to anticipate the information needs of the decision-making agent (DMA) based on their shared mental model, and to proactively seek, fuse and deliver relevant information to the decision-making agent. In addition, teammates can assist the DMA in re-assessing situations by monitoring the changes to the relevant expectancies.

Second, agents assisting human analysts in HS need to learn expertise from the interactions with human decision makers by generalizing an observed behavior into a knowledge structure that is more reusable. R-CAST can be easily extended to allow agents to learn novel experience in the collaborative story building process. In the feature-matching process, agents can also learn and fine-tune the thresholds for judging whether the current situation matches with past experience, or adjust the utilities of frequently matched experiences.

Third, since RPD is an abstract model of a human's decision-making process, R-CAST naturally combines the attributes of human cognition with computational intelligence. Through human interface, R-CAST achieves a certain degree of adjustable autonomy in making decisions. This agent architecture can not only enhance the capabilities of anti-terrorist analysts in identifying terrorist threats, but also pave the way for the next generation digital assistants that are "personalized" not only for individuals, but also for teams.

EXAMPLE

Command and Control in Complex and Urban Terrain (C2CUT)

In complex domains like C2CUT, it is almost impossible to collect complete information about the cues under concern all at a time. In such a situation, human decision makers typically consider cues gradually and refine their decisions progressively if necessary. For instance, when decision makers notice an anomaly as the situation evolves, they can adjust their recognition by considering more cues synthesized from the information that just becomes available.

We address this issue by organizing the experiences in a decision space by refinement relations. We say an experience refines another if it considers more cues (information) than the latter. A stronger refinement relation can be defined in terms of additional relations between the other components of experiences, like expectancies, COAs. For instance, for some types of decisions, it may make sense to say that an experience is a refinement of another if it considers more information (cues) in the recognition, both share the same goals, and the course of actions associated with one experience is simply the prefix of what is associated with the other. From such a perspective, experiences in an EKB can be virtually viewed as being partitioned by some experience refinement relations. For the example illustrated in FIG. 4, after experience e10 being considered, experience e23 can be selected in the next round of recognition as more information becomes available.

Figure 4:
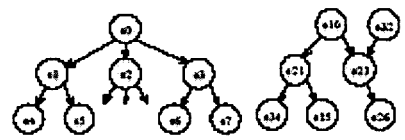
FIG. 4 shows a structure of a decision space.

An expected situation can reinforce current recognition, while an anomaly can weaken it. FIG. 4 shows a structure of a decision space. Suppose e3 is the current recognition, a decision maker needs to pay attention to cues of e6 and e7 (for further recognition) and the expectancies or anomalies of e0 and e3 (for revising current recognition). The example shows that in a decision space, a decision-maker should pay attention to and collect (ask others or investigate by itself) information about cues of the lower-level experiences.

In sum, by organizing experiences as decision spaces and modeling the information requirements as cues, anomalies, and expectancies, R-CAST agents can efficiently reason about time-sensitive information requirements for complex decision tasks. The algorithm for adaptive decision-making can be found in (Fan, et al., 2005a).

Assisting C2CUT Using R-CAST

Let's see how a small event like a group forming may cause a ripple effect on everything that is going on. Suppose a large group of locals starts to form in a section of a city. The situation needs to be monitored for the peace keeping forces because they may need to react. This same situation could also cause a problem for the humanitarian effort as well: the supply route may have to be altered to avoid the group. This same group could also cause a problem for the combat forces to capture the key person. The combat forces may have to delay their mission until the streets are clear of locals.

Figure 5:
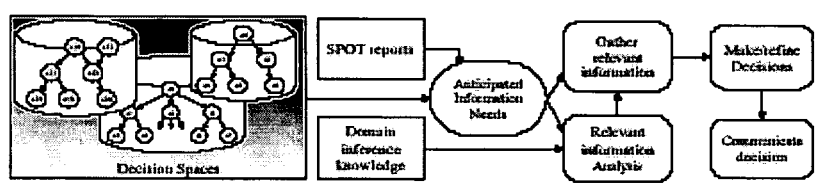
FIG. 5 illustrates the roles S2AA plays in helping S2 human collect information and make decisions.

It is thus very important to distribute the correct information to the staff officers and to create for them a situational awareness. In this project, we used R-CAST agents to assist human operators by monitoring multiple types of situations and alerting human whenever critical situations occur. Our scenario involves three battle functional areas (BFAs): the intelligence cell (S2), the operations cell (S3), and the logistics cell (S4), each is assisted by an R-CAST agent. Our discussion below centers on S2's assistant agent (S2AA). FIG. 5 illustrates the roles S2AA plays in helping S2 human collect information and make decisions.

S2AA first anticipates the information needs based on the incoming SPOT reports and the cues under its concern (i.e., captured in S2AA's decision spaces). If necessary, it also infers tacit information needs based on its expertise on inference knowledge. The agent then either asks other teammates (e.g., S2 human) or initiates a COA (e.g., launching an UAV) to collect the relevant information. Depending on the level of time stress, the more information S2AA collects, the better decision it can make. In the following, we only focus on decisions about information need analysis and information exchange rather than on decisions about course of physical actions.

Peacekeeping Operation

The goal of the peacekeeping operation is to keep the tribes from confrontation. SPOT reports will be generated about any crowd growing larger than some threshold levels or appearance of key persons in those crowds in the areas being patrolled. To alleviate S2 suite human's work load and cognitive load, R-CAST agent is used to assist S2 human by processing the incoming SPOT reports and making timely decisions on whether and how to alert S2 human regarding the identified threats based on the relevant experiences. Here is an experience of S2AA: If the crowd size is so large that a reinforcement call is required to be warranted to avert confrontation, the assistant agent will alert the S2 human. With approval from S2 human, the assistant agent will inform the combat officers about the situation. Then the combat officers can make a decision of ordering a troop in response. If the crowd size is not so large but there is a key person spotted in that crowd, the assistant agent queries the MIDB to seek information about the latest update of the person's threat level. If the threat is high enough, the assistant agent will alert the combat officers to consider launching a capture mission.

Below is a sample session of agent-human interaction in the peacekeeping context (FIG. 6):

1. S2AA receives a SPOT report containing the following information:
(Size Group1 15),
(Has_key_person Group1 AdMir_Erry), and
(Location Group1 30 60);
2. S2AA sends a query to MIDB Agent:
(threat_level AdMir_Erry?level);
3. S2AA gets a reply from MIDB Agent:
(threat_level AdMir_Erry high);
4. S2AA interprets current situation and concludes that the threat from Group 1 is high, so it displays an icon on S2's workspace map, and pops up an alert window with all the information about Group1 to S2 human;

5. S2 human confirms the alert (with additional information, if necessary) to the S2AA;

6. S2AA publishes the icon on the general map;

7. S2AA alerts S3 human via S3's assistant agent (which displays an icon on S3's workspace map).

Figure 6:
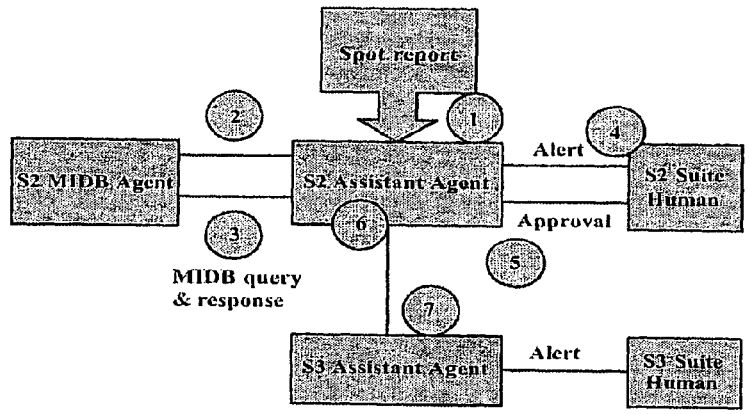
FIG. 6 illustrates an agent-human interaction pattern in a peacekeeping context.
Figure 7:
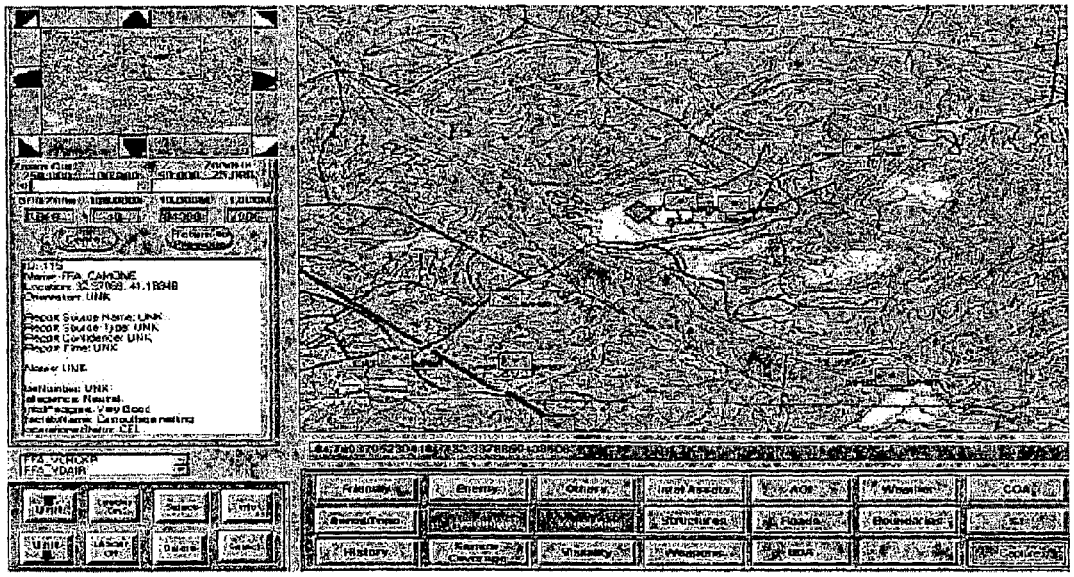
FIG. 7 is a screen shot of a workspace map associated with FIG. 6.

FIG. 6 illustrates this interaction pattern. FIG. 7 is a screen shot of S2's workspace map.

Combat Operation

Figure 8:
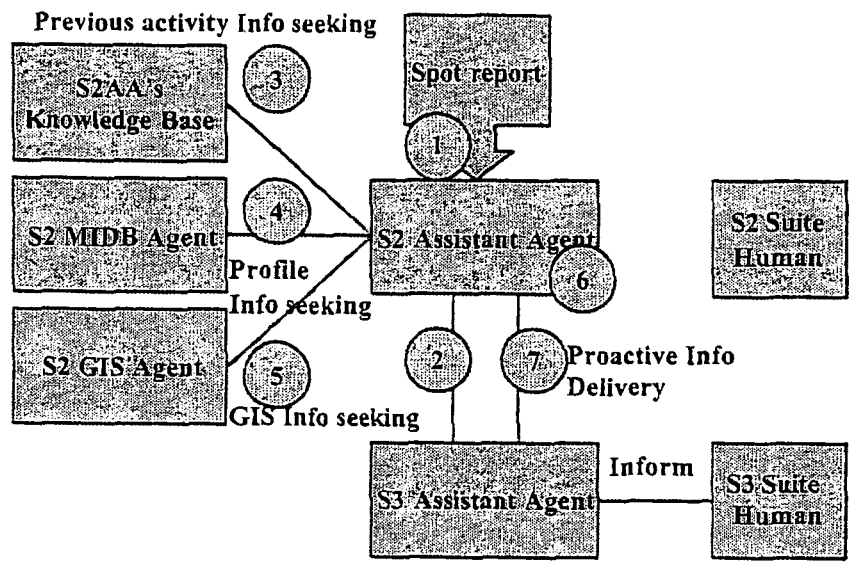
FIG. 8 is an interaction pattern for combat.

A combat operation involves capturing or killing a key insurgent. FIG. 8 is an interaction pattern for combat. Once a key insurgent has been spotted in a building, the combat officers (S3) need all the information about the building itself and its surrounding areas. Thus, as soon as S2AA receives a SPOT report containing information about a key insurgent, it will alert the combat officer about the presence of a key insurgent. In addition, S2AA executes a plan for gathering all related information about the insurgent and the area that the insurgent was spotted in. More specifically, S2AA will query the MIDB and gathers more information about the insurgent, terrain information and floor plans of the building, if any, then proactively share such information with S3AA, which presents the information to S3 human along with an icon on the map displaying the location of the key insurgent.

Below is a sample session of agent-human interaction in the combat context:

1. Spot Report comes in to S2AA:
(key_insurgent Laden),
(in building Laden house1 32.36-84.84);
2. S2AA alerts S3 (through S3AA, which displays an icon on S3's workspace map);
3. S2AA searches its knowledge base about the activity information about Laden;
4. S2AA queries the MIDB agent about the profile information of Laden;
5. S2AA queries the GIS agent about relevant terrain information;
6. S2AA displays an icon on S2's workspace map, and on the general map if S2 approves;
7. S2AA forwards all the acquired information to S3AA, which updates the icon on S3's workspace map.

Humanitarian Operation

The humanitarian operation focuses on monitoring routes that supply food and hospital materials throughout the city. If a threat is detected or expected, the route needs to be changed or escorted by forces.

Figure 9:
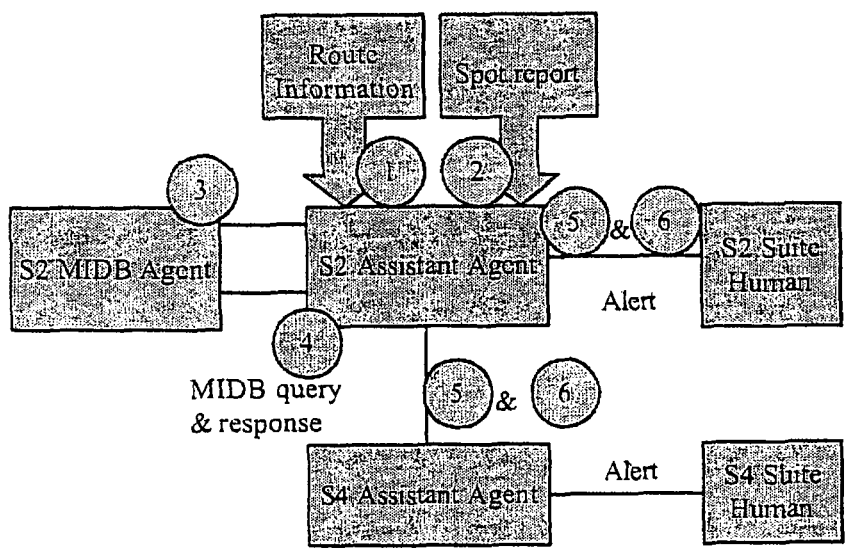
FIG. 9 is an interaction pattern for a humanitarian operation.

FIG. 9 is an interaction pattern for a humanitarian operation. The route information is fed to S2's assistant agent (S2AA) for monitoring. S2AA then investigates the route, identifies potential threat areas, and informs the human user, if any. Threat can be either from an IED (Improvised Explosive Device) or from a hostile group. The decision space for the humanitarian operation consists of experiences that deal with different types of situations such as spotting an IED or spotting a hostile group along a route, and S2AA needs to decide whether to alert S4 with hostile information in an area.

Below is a sample session of agent-human interaction in the combat context:

1. S2AA gets updated information about supply routes;
2. S2AA receives a SPOT report about an IED:
(IED Bomb1),
(Location Bomb1 30 60);
3. S2AA sends a query to MIDB agent;
4. S2AA get replies from MIDB agent;
5. S2AA assesses the situation and concludes that that the IED has a threat to the route, so it displays an alert window with all the relevant information (IED name, location, time, etc.) on both the S2 and S4 machines;

6. In addition, an icon is published with all the relevant information on the general maps of S2 and S4.

References

[1] J. A. Cannon-Bowers, E. Salas, and S. A. Converse, Cognitive psychology and team training: Training shared mental models and complex systems, Human Factors Society Bulletin 33 (1990) 1-4.

[2] E. Hutchins. Cognition in the wild. Cambridge, Mass.: MIT Press, 1995.

[3] Ilgen, D. R., Major, D. A., Hollenbeck, J. R. and Sego, D. J. Team Research in the 1990's, in M. Chemers, R. A. Ayman, Eds., Leadership Theory and Research: Perspectives and Directions, San Diego: Academic Press (1993).

[4] G. A. Klein. A recognition-primed decision-making model of rapid decision-making. Decision Making In Action: Models and Methods (Eds: Gary A Klien, Judith Orasanu, Roberta Calderwood and Caroline E, Zsambok), pages 138-147, 1993.

[5] G. A. Klein. The recognition-primed decision (rpd) model: Looking back, looking forward. Naturalistic decision making (Eds: C. E. Zsambok and G. Klein), pages 285-292, 1997.

[6] G. A. Klein. Recognition-primed decision making. Sources of power: How people make decisions, pages 15-30, 1998.

[7] Y. Liang, et al. Implementing a Naturalistic Command Agent Design. In Proceedings of the tenth conference on Computer Generated Forces, Norfolk, Va., pages: 379-386, 2001.

[8] M. McNeese, E. Salas, and M. Endsley (Eds.). New trends in collaborative activities: Understanding system dynamics in complex environments. Santa Monica, Calif.: Human Factors and Ergonomics Society, 2001.

[9] J. Morrison, R. Kelly, and S. Hutchins. Impact of naturalistic decision support on tactical situation awareness. In Proceedings of the 40th Human Factors and Ergonomics Society Annual Meeting, page 199-203, 1996.

[10] E. Norling, L. Sonenberg, and R. Ronnquist. Enhancing multi-agent based simulation with human-like decision making strategies. In Proceedings of the second International workshop on Multi-Agent Based Simulation (Moss, S. and Davidsson, P. Eds), page 214-228, 2000.

[11] P. Panzarasa, N. Jennings, and T. Norman. Formalizing collaborative decision-making and practical reasoning in multi-agent systems. Journal of logic and computation, 12(1):55-117, 2002.

[12] F. Robichaud. Implementing a naturalistic command agent design. In Presented at the Workshop on Computerized Representation of RPD, 2002.

[13] H. A. Simon. A Behavioral Model of Rational. Choice. Quarterly Journal of Economics 69 (1955): 99-118.

[14] J. Sokolowski. Enhanced Military Decision Modeling Using a MultiAgent System Approach. In Proceedings of the Twelfth Conference on Behavior Representation in Modeling and Simulation, Scottsdale, Ariz., May 12-15, pp. 179-186, 2003.

[15] J. Sokolowski. Representing Knowledge and Experience in RPDAgent. In Proceedings of the Twelfth Conference on Behavior Representation in Modeling and Simulation, Scottsdale, Ariz., May 12-15, pp. 419-422, 2003.

[16] K. Sycara and M. Lewis. Forming shared mental models. In Proc. of the 13$^{th}$ Annual Meeting of the Cognitive Science Society, pages 400-405, 1991.

[17] W. Warwick and et al. Developing computational models of recognition-primed decision making. In Proceedings of the tenth conference on Computer Generated Forces, Norfolk, Va., page 232-331, 2001.

[18] D. D. Woods, E. S. Patterson, and E. M. Roth. Aiding the Intelligence Analyst in Situations of Data Overload: A Diagnosis of Data Overload. Institute for Ergonomics/Cognitive Systems Engineering Lab Report, ERGO-CSEL 98-TR-03, The Ohio State University, 1998.

[19] J. Yen, J. Yin, T. R. Ioerger, M. Miller, D. Xu, and R. A. Volz. CAST: Collaborative Agents for Simulating Teamwork. In Proceedings of the 7th IJCAI' 2001, 1135-1142.

[20] Warwick, W., McIlwaine, S., Hutton, R. (2002). Developing computational models of recognition-primed decisions: Progress and Lessons Learned. In *Proceedings of the 11th conference on Computer Generated Forces and Behavior Representations*, Orlando, Fla.

[21] Allen, J., Barry, K., and McCormick J. (2004). Plan execution monitoring with distributed intelligent agents for battle command. Proceedings of SPIE, Vol. #5441.

[22] Knoblock, C. and Ambite, J. L. (1997). Agents for Information Gathering. In J. Bradshaw, editor, *Software Agents*. AAAI/MIT Press, Menlo Park, Calif.

[23] Turner, S. R. (1994). The *Creative Process: A Computer Model of Storytelling and Creativity*. Lawrence Erlbaum Associates, Hillsdale, N.J.

[24] Endsley, M. R., Robertson, M. M. (2000). Training for situation awareness in individuals and teams. In M. R. Endsley & D. J. Garland (Eds.), *Situation awareness analysis and measurement*. Mahwah, N.J.: LEA.

[25] Gonzalez, C., Juarez, O., Graham, J. (2004). Cognitive and Computational Models as Tools to Improve Situation Awareness. *Proceedings of the 48th Annual Meeting of the Human Factors and Ergonomics Society*. New Orleans, La., September.

[26] Christofferson, K., Woods, D. D. (2002). How to make automated systems team players. In E. Salas (Ed.), *Advances in Human Performance and Cognitive Engineering Research*, Vol. 2. JAI Press, Elsevier.

[27] Slade, S. (1991). Case-Based Reasoning: A Research Paradigm. *AI Magazine,* 12(1):42-55.

[28] Hollenbeck, J. R.; Major, D. A.; Sego, D. J.; Hedlund, J.; Ilgen, D. R.; and Phillips, J. 1997. Team decision-making accuracy under difficult conditions: construct validation of potential manipulations using the TIDE2 simulation. In Brannick, M. T.; Salas, E.; and Prince, C., eds., *Team performancsassessment and measurement.* 111-136.

The invention claimed is:

1. An improved decision-making process, comprising the steps of:
   providing a collaborative, team-oriented computer architecture wherein human and software agents interact through a shared mental model including an experience knowledge base;
   receiving information regarding a current situation to be analyzed;
   consulting the experience knowledge base to qualify the received information based upon any similarities to the current situation;
   presenting the qualified information to a user through one of the agents;
   interacting with the user to receive assistance in the form of assumptions or expectancies about the situation;
   providing the refined information and assumptions or expectancies to other agents;
   utilizing cues in the experience knowledge base to contact one or more external information sources to gather missing, relevant information, if any, in support of the assumptions or expectancies;
   using the missing, relevant information in conjunction with other collected information to determine whether a decision about the situation is evolving in an anticipated direction; and, if so:
   informing the user and updating the experience knowledge base to enhance the quality or timeliness of future decisions regarding similar situations.

2. The decision-making process of claim 1, including agents operative to choose a decision by comparing the situation with information contained in the experience knowledge base.

3. The decision-making process of claim 1, including agents operative to:
   choose a decision by comparing the situation with information contained in the experience knowledge base; and
   if the agent cannot handle the task due to lack of expertise, transfer the decision-making task to a more competent agent.

4. The decision-making process of claim 1, wherein, if an agent makes a commitment to a decision task regarding the situation, it informs other agents about the task so that the other agents to better assist in the overall decision-making process.

5. The decision-making process of claim 1, including agents that anticipate the information requirements of an agent that makes a commitment to seek, fuse, or share relevant information.

6. The decision-making process of claim 1, including agents operative to perform situation recognition through investigation and feature matching.

7. The decision-making process of claim 1, including agents operative to request or provide missing information from or to other agents.

8. The decision-making process of claim 1, including agents operative to:
   a) select a plan of action regarding the situation, and
   b) evaluate the plan of action by simulating effects that the plan would have.

9. The decision-making process of claim 1, including agents operative to:
   a) select a plan of action regarding the situation by determining whether preconditions of the selected plan are satisfied with respect to the experience knowledge base, and
   b) evaluate the plan of action by asserting effects of the plan into the experience knowledge base and check whether relevant goals become true.

10. The decision-making process of claim 1, including agents operative to:
    evaluate a plan of action regarding the situation; and
    a) if the plan is deemed a workable solution, coordinate other agents to execute the plan or, if not:
    b) evaluate another plan.

11. The decision-making process of claim 1, including agents operative to:
    select a plan of action regarding the situation; and
    monitor associated expectancies until the completion of the selected course of action.

12. The decision-making process of claim 1, including agents operative to:
    select a plan of action;
    monitor associated expectancies associated with the plan; and
    use the expectancies to refine a decision regarding the situation.

13. The decision-making process of claim 1, including agents operative to maintain the contents of the shared mental model.

14. The decision-making process of claim 1, including agents operative to adjust goals or intentions shared by the team.

15. The decision-making process of claim 1, including agents operative to adjust the structure of a team process.

16. The decision-making process of claim 1, including agents operative to adjust the progress of the RPD model.

17. The decision-making process of claim 1, wherein the situation is related to terrorism.

* * * * *

UNITED STATES PATENT AND TRADEMARK OFFICE
CERTIFICATE OF CORRECTION

Page 1 of 1

| | |
|---|---|
| PATENT NO. | : 8,442,839 B2 |
| APPLICATION NO. | : 11/181146 |
| DATED | : May 14, 2013 |
| INVENTOR(S) | : John Yen et al. |

It is certified that error appears in the above-identified patent and that said Letters Patent is hereby corrected as shown below:

In the Specification:

Column 6, line 66, Delete "an", Insert --a--

Column 7, line 32, Delete "care", Insert --carry--

Column 7, line 65, Delete "an", Insert --a--

Column 8, line 4, after they, Insert --are--

Column 9, line 14, after hypothesis, Insert --is--

Column 9, line 15, after until, Insert --they--

Column 9, line 22, Delete "actions", Insert --action--

Column 9, line 47, Delete "keeping"

Column 10, line 2, Delete "member", Insert --members--

Column 10, line 45, Delete "in"

Column 14, line 19, Delete "lost", Insert --loss--

Column 14, line 25, after weapon, Insert --,--

In the Claims:

Column 20, claim 4, line 23, Delete "to", Insert --can--

Signed and Sealed this
Fourteenth Day of October, 2014

Michelle K. Lee
*Deputy Director of the United States Patent and Trademark Office*